July 12, 1960 R. J. CHRISTIANSEN ET AL 2,944,456
AUTOMATIC STITCHER TRIMMER
Filed Dec. 5, 1957 11 Sheets-Sheet 8

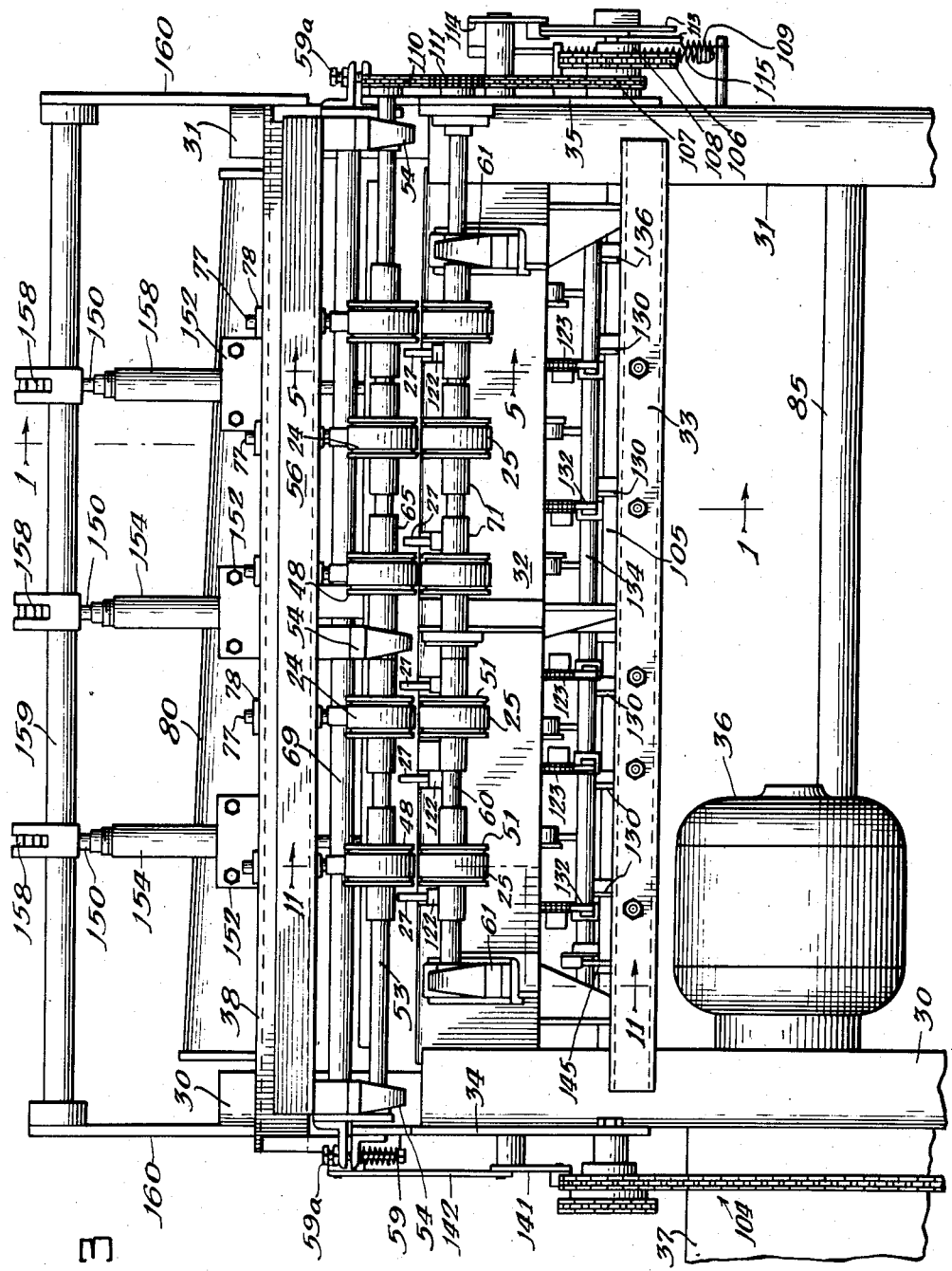

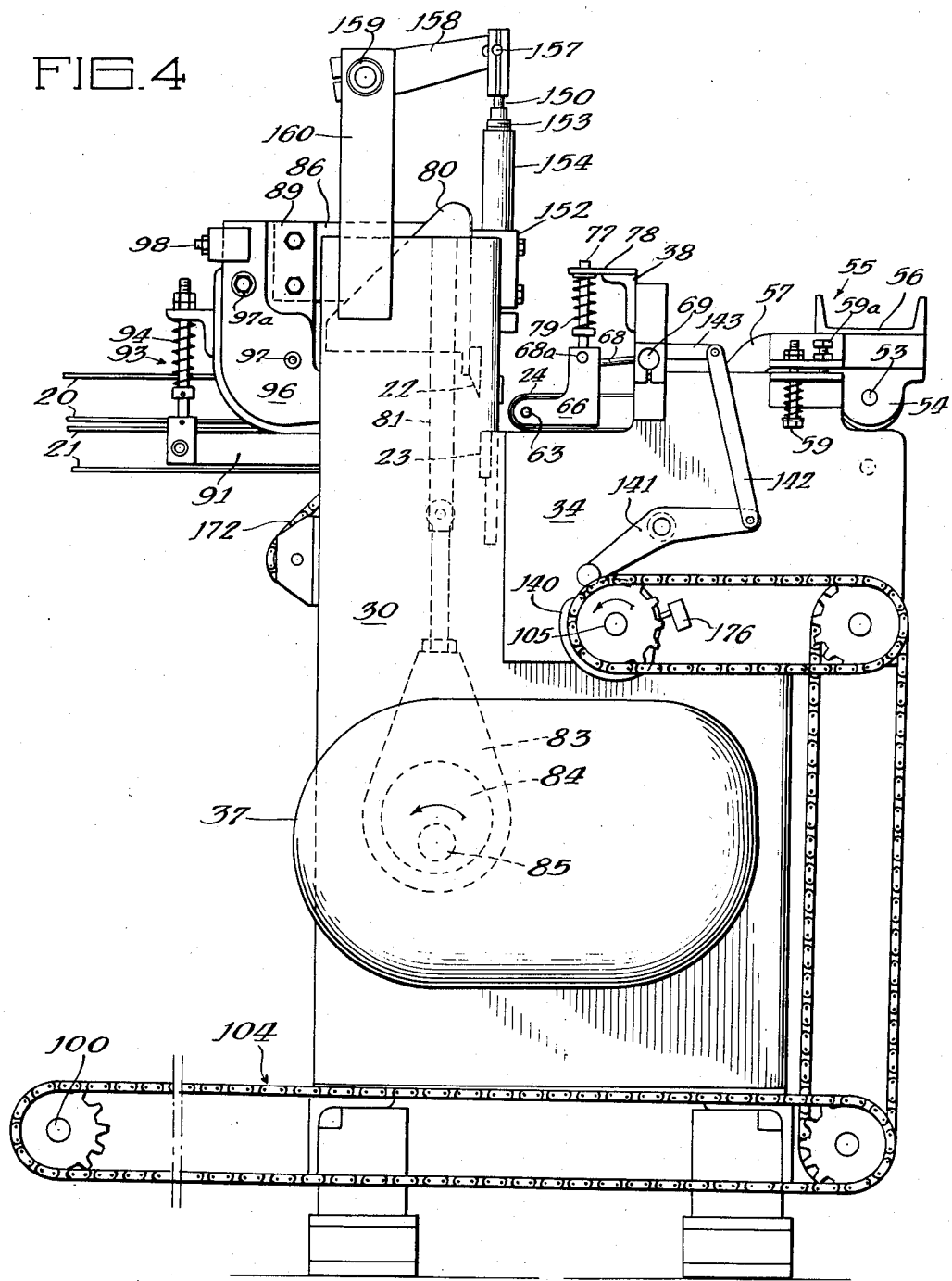

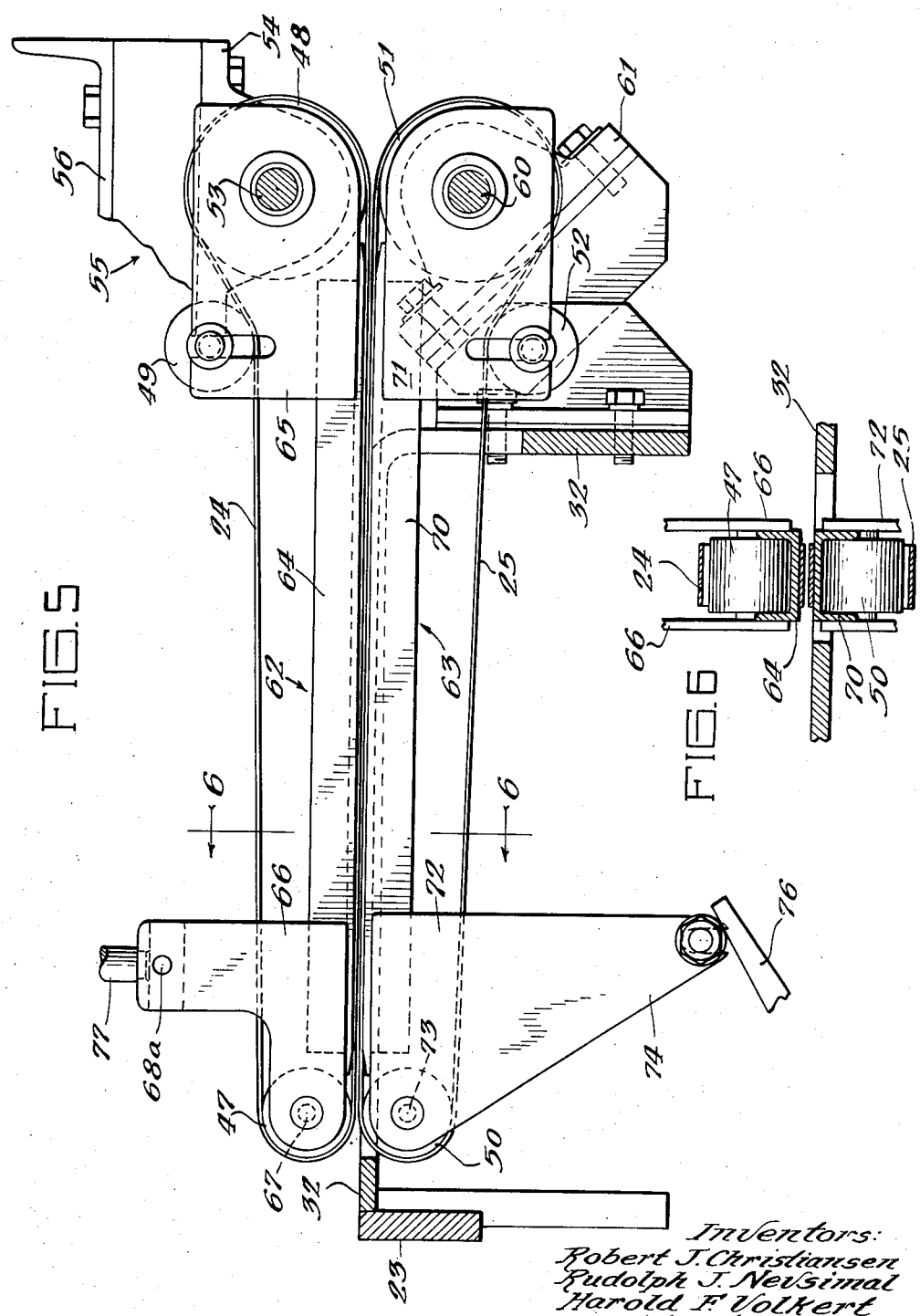

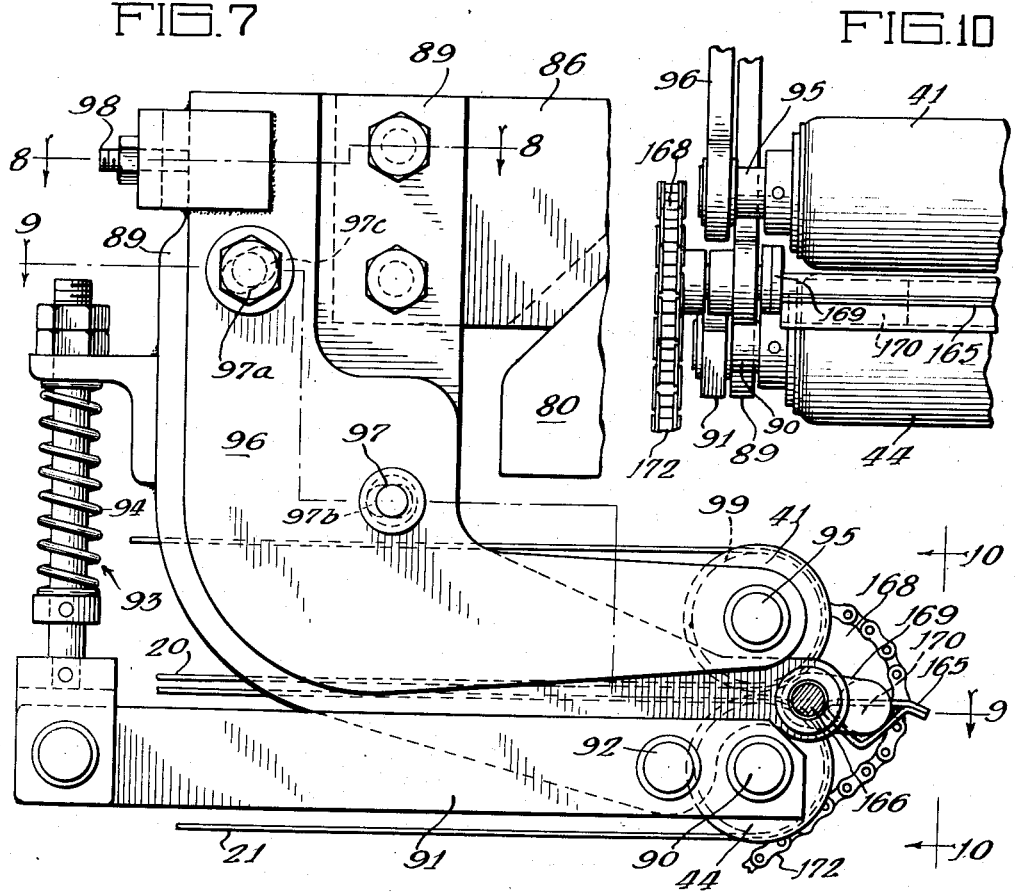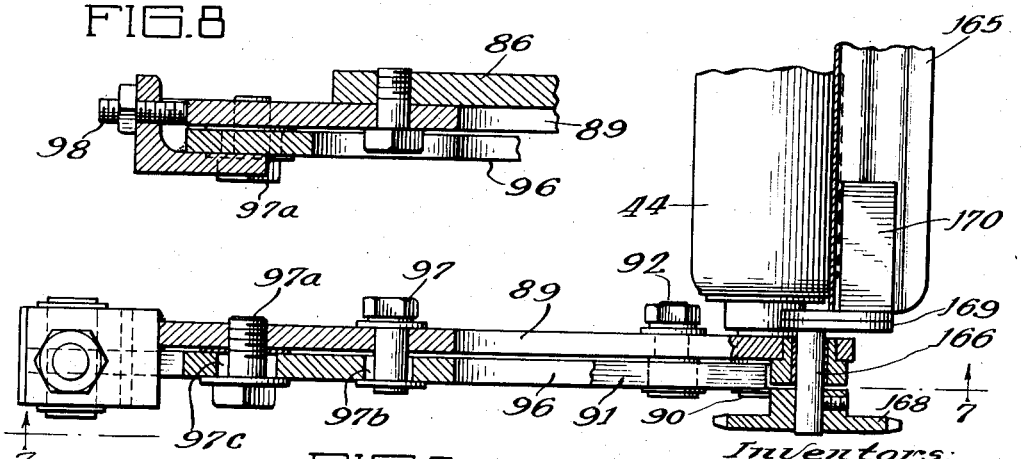

Inventors:
Robert J. Christiansen
Rudolph J. Nevsimal
Harold F. Volkert
By: Zabel, Baker, Fuhk,
Jones & Gelhaar
Attorneys

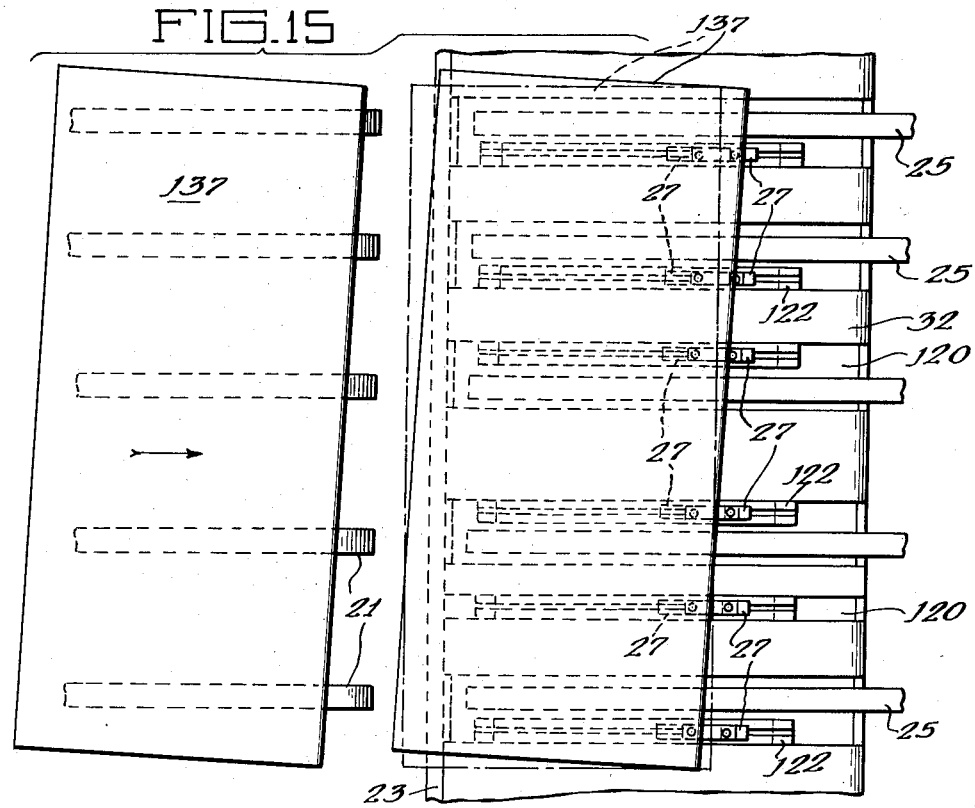
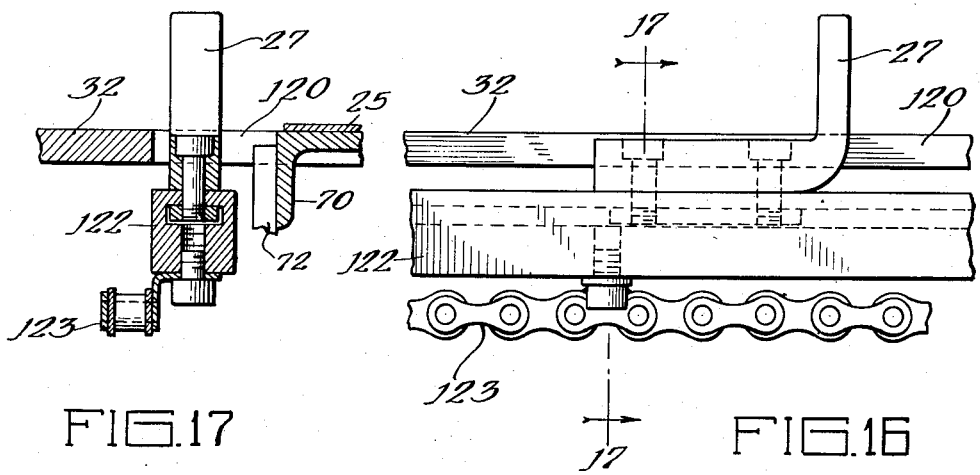

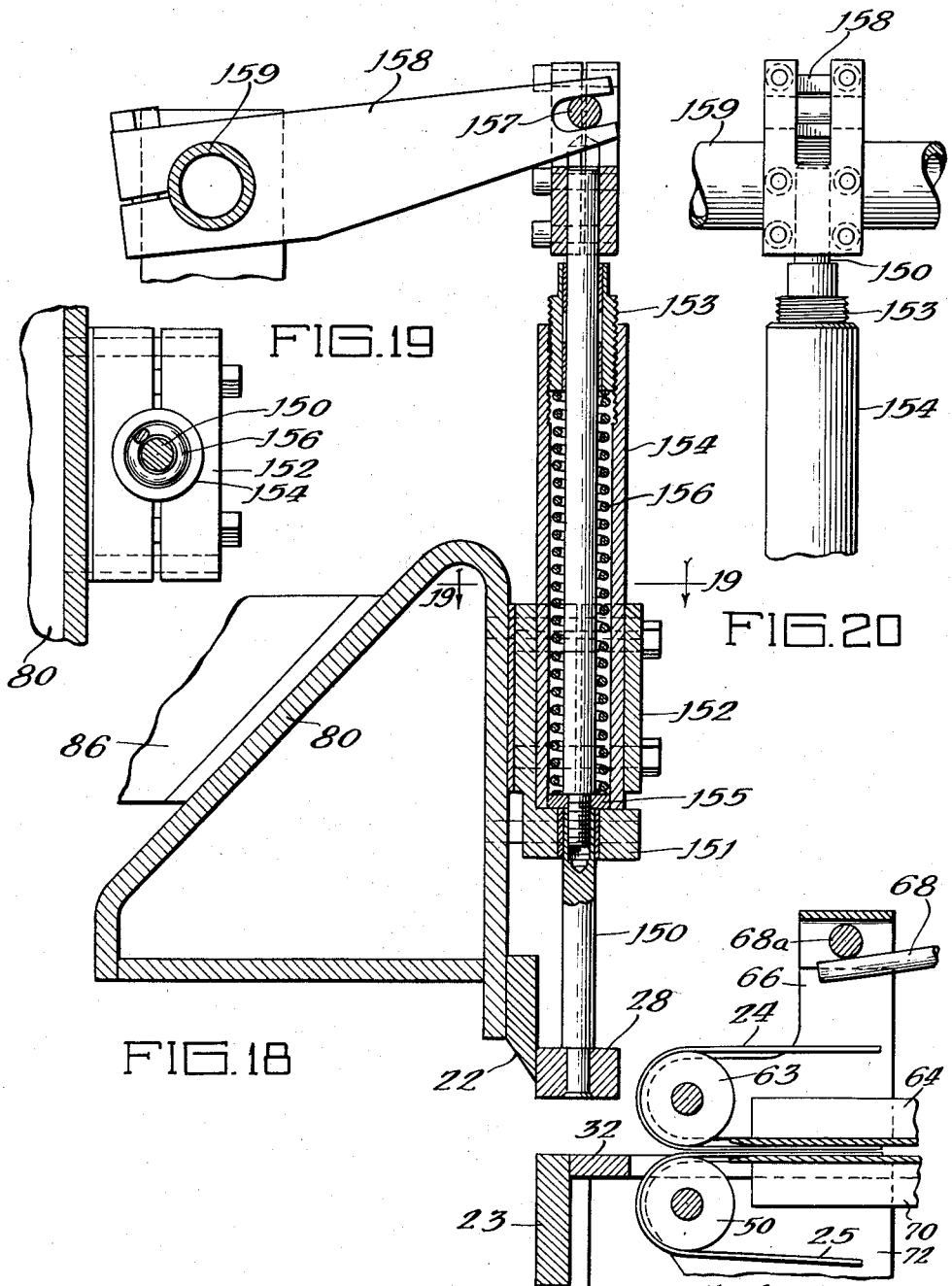

July 12, 1960  R. J. CHRISTIANSEN ET AL  2,944,456
AUTOMATIC STITCHER TRIMMER
Filed Dec. 5, 1957  11 Sheets-Sheet 11
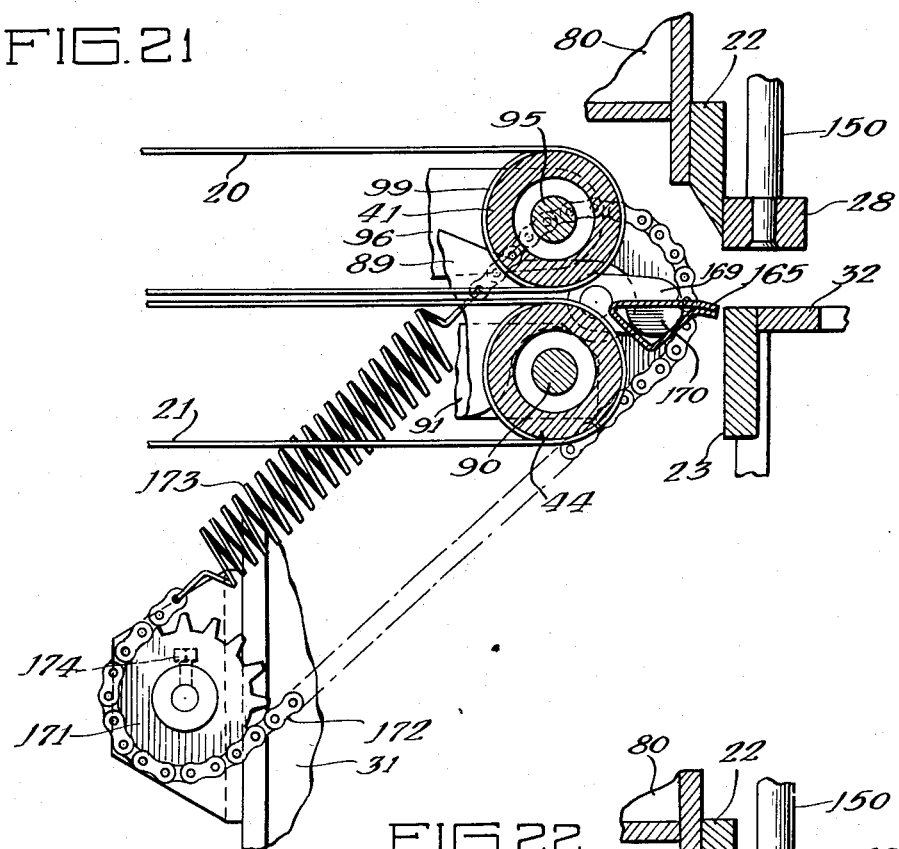
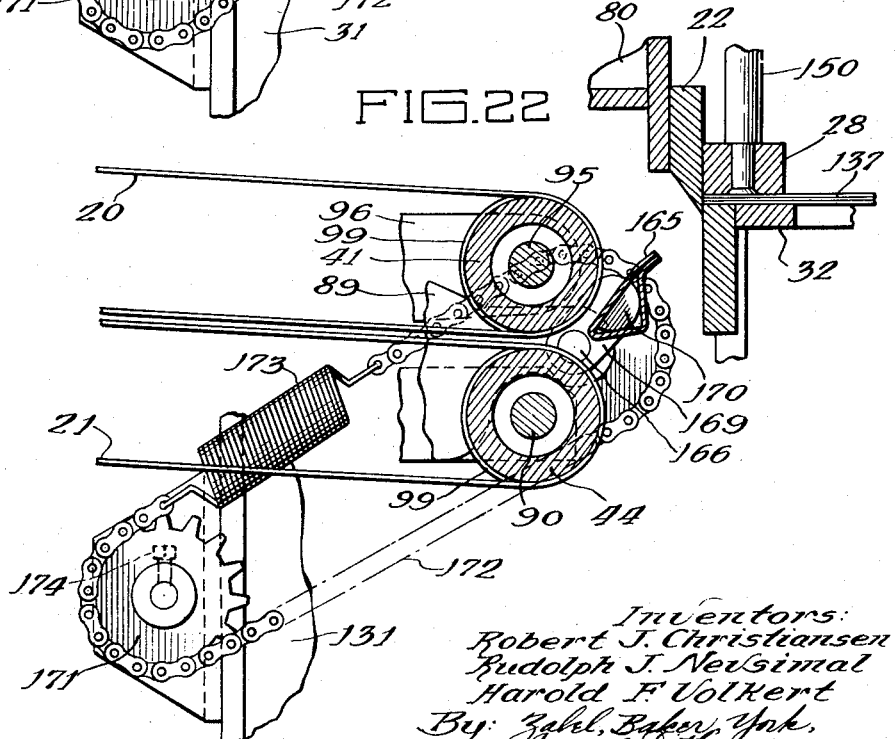

United States Patent Office 2,944,456
Patented July 12, 1960

2,944,456

AUTOMATIC STITCHER TRIMMER

Robert J. Christiansen, Park Ridge, Rudolph J. Nevsimal, North Riverside, and Harold F. Volkert, Glenview, Ill., assignors to F. N. Volkert & Co., Chicago, Ill., a corporation of Illinois Filed Dec. 5, 1957, Ser. No. 700,781

25 Claims. (Cl. 83—151)

This invention relates to improvements in automatic stitcher trimmers for trimming signatures as they leave the stitcher.

Stitching machines have been devised which operate at considerable speed, of the order of 75 signatures per minute. The trimming operation requires the movement of the signatures to a trimming station, the stopping and positioning of the same at the trimming station, trimming the signature, and removing the signatures from the trimming station. All of these operations have to take place in 8/10 of a second, assuming no overlap in the cycle. Such conditions require a tape speed, or a signature movement, of the order of 30 feet per second.

Heretofore, the stopping and positioning means has comprised one or more retractible stops. When the signature is moving at a speed of the order indicated, it is difficult to obtain accurate positioning. For instance, the signatures are inclined to bounce back after hitting the stop. Furthermore, when the tapes are moving at this speed, there is likely to be a twisting or angular displacement of the signature due to inequalities at the bite of the tapes at the pick up point.

Another problem encountered in machines of this type is that of the smudging of the signatures or pamphlets by the tapes when the signature is stationary. Another problem is that of the canting of the pressure foot which holds the signature during the operation. A still further problem is the difficulty in designing a machine such that a signature can be trimmed to small dimensions.

An object of this invention is to provide a device which is capable of high speed operation and which will take the signatures one at a time from the stitching machine and trim the same.

Another object of this invention is to provide improved stopping and positioning means which is adapted for operation at a high speed. According to this aspect of the invention, means are provided to move the stops rearwardly so as to straighten out the signature, thus avoiding malpositioning due to bouncing and twisting.

Still another object is to provide an automatic trimmer which embodies improved means for separating the outfeed tapes to avoid smudging of the signatures during the time that they are stationary.

In devices of this type a bulky blade head is required to impart dimensional stability to the shear blade. If the head is located on the forward side of the blade, then it is not possible to trim to small dimensions; if located on the rearward side of the blade, it is not possible to bring the infeed tapes sufficiently close as to avoid inaccuracies in the feeding of the signatures through the gate or opening below the shear blade.

A further object of the present invention is to provide a construction which permits stops to be positioned considerably closer to the shear blade than in the case of devices now commercially available. According to the present invention the blade head is mounted on the rearward side of the shear blade, and the infeed tapes are carried by the head itself. Thus, there can be no interference between the blade head and the infeed tapes, with the result that the infeed tapes can be positioned quite close to the shear blade.

Another object of my invention is to provide an improved bridge and operating means therefor, thereby eliminating interference with the blade head and possible clogging of the bridge by trimmings.

Still another object is to provide in a device of this type, a presser foot which will not cant, thereby avoiding the necessity of feeding the signatures in a centered relationship.

Still another object is to provide means for flattening the signatures just before trimming so as to provide a square trimmed edge. According to this aspect of the invention, a pair of squeeze rollers are provided which crease the signature at the fold line, thereby causing the pages to lie flat.

A still further object is to provide improved means for mounting the tape supporting elements, or pulleys, so that the bite, or space, between them can be regulated to accommodate signatures of varying thickness, and also to provide suitable pressure relief means to avoid jamming.

Other objects, features and advantages will become apparent as the description proceeds.

With reference now to the drawings, in which like reference numerals designate like parts:

Fig. 3 is a front view thereof;

Fig. 4 is a left side elevation thereof;

Fig. 5 is an enlarged view taken along line 5—5 of Fig. 3, showing the pulley supporting means for the outfeed tapes;

Fig. 6 is a transverse section taken along line 6—6 of Fig. 5;

Fig. 7 is an enlarged elevation taken along line 7—7 of Fig. 9, and showing the roller supporting means for the infeed tapes;

Fig. 8 is a horizontal section taken along line 8—8 of Fig. 7;

Fig. 9 is a horizontal section taken along line 9—9 of Fig. 7;

Fig. 10 is an end view of a portion of Fig. 7;

Fig. 15 is a diagrammatic plan view illustrating the operation of the stop means;

Fig. 16 is an enlarged detail showing the manner in which the stop member is mounted;

Fig. 17 is a vertical transverse section along line 17—17 of Fig. 16;

Fig. 18 is an enlarged sectional view showing the means for mounting the presser foot;

Fig. 19 is a horizontal section taken along line 19—19 of Fig. 18;

Fig. 20 is a front elevation of the upper portion of Fig. 18;

Fig. 21 is a longitudinal sectional view showing the means for operating the bridge; and Fig. 22 is a view similar to Fig. 21 but showing the parts in a changed position.

Figure 1:
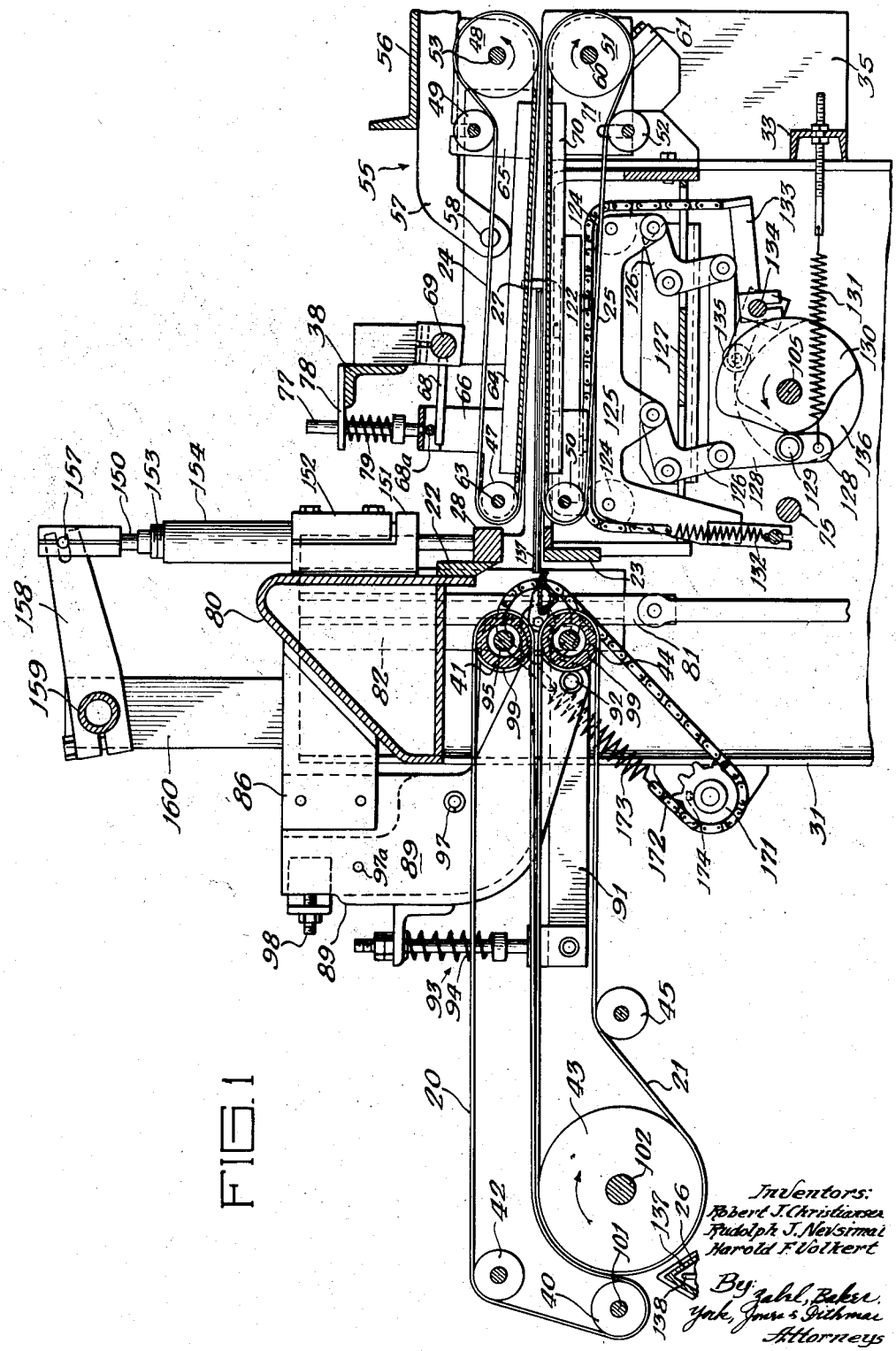
Fig. 1 is a vertical longitudinal section taken along line 1—1 of Fig. 3, showing a preferred embodiment of this invention.

The stitcher trimmer, as shown in Fig. 1, comprises a pair of infeed tapes 20 and 21, a shear blade 22, and outfeed tapes 24 and 25. The infeed tapes pick up a signature or pamphlet 137 from the stitcher rail 26, and move it beneath the shear blade 22 and into engagement with stop members 27. After the signature has been properly positioned by the rearward movement of the stop members, the open end of the signature is clamped by the presser foot 28 after which the pamphlet is trimmed by the shear blade 22. Then, the stop members 27 are retracted downwardly, and the outfeed tapes 24 and 25 are moved together or closed so that the signature will be engaged and removed from the trimmer device to a suitable stacking table, not shown.

Figure 2:
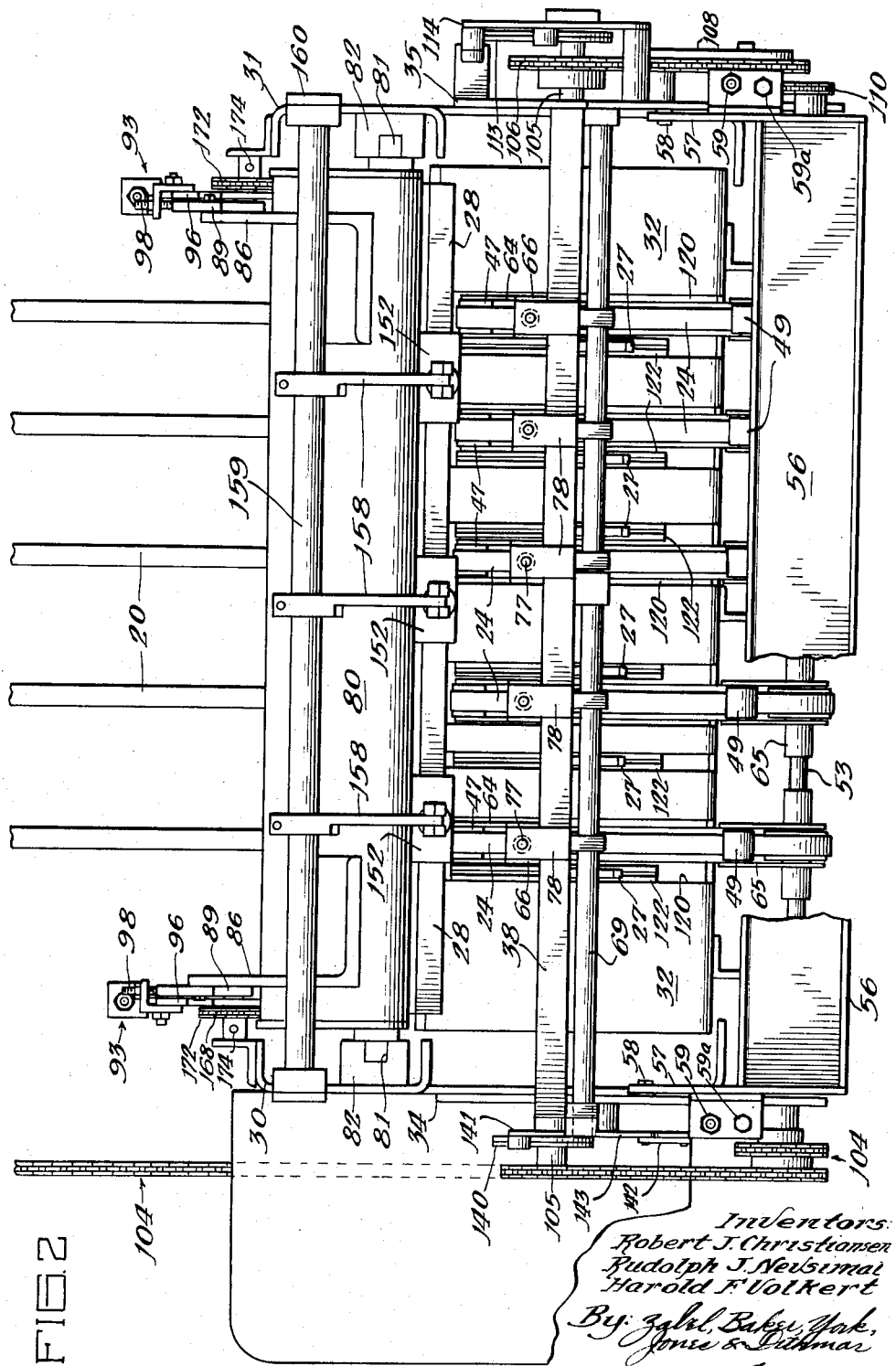
Fig. 2 is a plan view of the machine shown in Fig. 1.

The machine frame as shown in Figs. 2, 3, and 4, comprises a pair of side frames 30 and 31 and a flanged bed plate 32, which is secured to and supported by the side frames to provide a stable structure. Other cross members, such as cross members 33 and 38, may be provided. The structure also includes extension plates 34 and 35 which are secured to the side frames 30 and 31, respectively, and which serve as a mounting for certain of the shafts and other mechanism to be later described.

The mechanism will be described first with respect to the means by which the infeed and outfeed tapes are mounted and driven; secondly, with respect to means by which the stop members 27 are mounted and driven; and thirdly, with respect to the construction and operation of the presser foot 28 and its adjacent parts.

In the description, the term "forwardly" is used to agree with the forward motion of the signatures, with the result that the left end of the machine, as shown in Fig. 1, is considered to be the rear and the right end is considered to be the front of the machine.

The infeed and outfeed tapes

As indicated in Figs. 2 and 3, each feeding element 20, 21, 24, 25, comprises a series of spaced tapes, the supporting elements for each comprising separate pulleys, unless otherwise indicated. Thus, in connection with the description, where reference to the elements associated with any particular tape may involve the use of the singular, it will be understood that the same elements are applicable to the other tapes of that series which comprises a single feeding element.

The upper infeed tape 20 is supported at its rear end by a pick up pulley 40, at its front end by a roller 41, and at an intermediate point by a suitable idler 42. The lower infeed tape 21 is supported by a rear pick up drum 43, a front roller 44, and an idler 45.

The upper outfeed tape 24 is supported at its rear end by a pulley 47, at its front end by a pulley 48, and at an intermediate point by an idler 49. The lower outfeed tape 25 is supported at its rear end by a pulley 50, at its front end by a pulley 51, and at an intermediate point by an idler 52.

The upper front pulleys 48 are mounted on a common upper shaft 53 and the lower front pulleys are mounted on a common lower shaft 60. The upper shaft 53, journalled in bearings 54, is carried by an adjustable frame 55, and the lower shaft 60, journalled in bearings 61, is stationary, being mounted on the front flange of the bed plate 32 as shown in Figs. 3 and 5.

Figure 12:
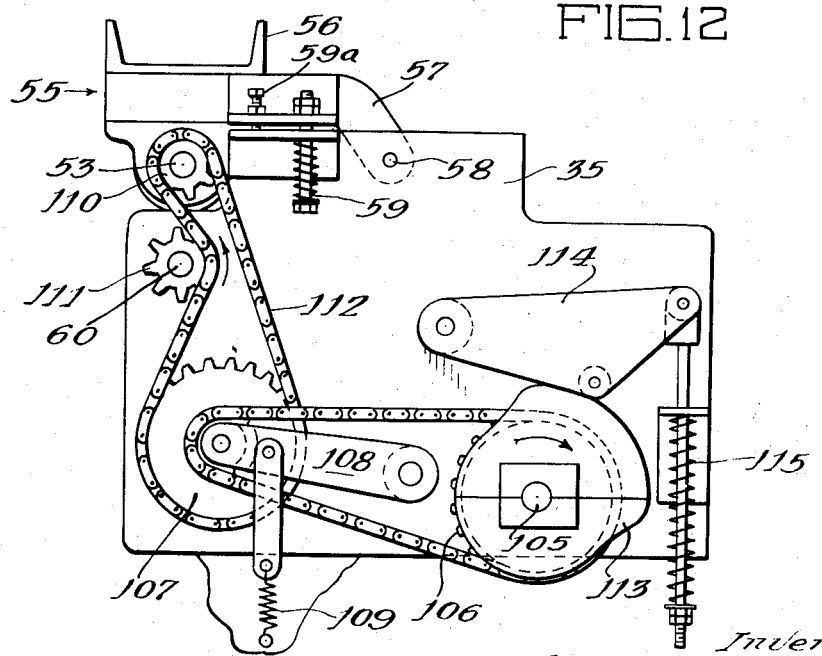
Fig. 12 is a right elevation showing the drive means for the outfeed tapes.

The frame 55 comprises a transverse channel member 56 which is mounted at either end on arms 57, which are pivoted to the extension plates 34 and 35 at pivots 58 as shown in Figs. 1, 2, and 12. Thus, the front end of the upper outfeed tapes 24 may be raised as a unit. A spring loading device 59 urges the frame 55 and the tapes downwardly into a position determined by a suitable stop screw 59a.

According to the present invention, bite adjustment means are provided to regulate the spacing between cooperating tapes, so as to accommodate signatures of differing thickness. Furthermore, in the event that a signature of double thickness is fed to the trimmer by the stitching mechanism, one of the tapes of each pair is resiliently mounted to provide a pressure relief in order to avoid jamming of the machine. The spring loading device 59 comprises the pressure relief for the front end of the outfeed tapes, and the stop screw 59a constitutes the bite adjustment.

The upper and lower rear pulleys 47 and 50 are mounted on swinging frames 62 and 63 respectively, shown in Figs. 5 and 6, so that the tapes 24 and 25 may be moved between the open position shown in Fig. 1 and the closed position shown in Fig. 5. There is one swinging frame for each tape.

The swinging frame 62 comprises a longitudinally extending channel member 64 carrying a bearing yoke 65 at its front end for the upper front shaft 53. At its rear end it carries a bracket 66 in which the shaft 67 for pulley 47 is journalled. Thus, the frame 62 and the upper tape 24 are mounted for swinging movement about the axis of the upper front shaft 53, and the web of the channel 64 serves as a backing for the tape 24. As shown in Fig. 1, the bracket 66 is engaged by an arm 68 mounted on a rock shaft 69 so that the upper swinging frame 62 may be swung between its open and closed position.

The lower swinging frame 63 comprises a longitudinally extending channel member 70 carrying a bearing yoke 71 at its front end for the lower front shaft 60. At its rear end, it carries a bracket 72 comprising two plates welded to the flanges of the channel 70. The shaft 73 for the lower rear pulley 50 is journalled in the bracket 72. One of the plates of the bracket 72 is extended downwardly to provide a downward extension 74, shown in Fig. 5, which at its lower end is engaged by an arm 76 secured to a rock shaft 75. Thus, oscillation of the rock shaft 75 causes the lower swinging frame 63 to move between its open and closed position in much the same manner as the movement of the upper swinging frame 62 is controlled by the rock shaft 69.

As shown in Fig. 1, the bracket 66 of the upper swinging frame 62 is provided with a guide stem 77 which is received within a suitable opening in a plate 78 which is mounted on and projects rearwardly from the crossmember 38. A spring 79 surrounds the guide stem and urges the bracket downwardly into engagement with the arm 68. A transverse hardened pin 68a is secured in the bracket to provide a suitable bearing surface for the arm 68. The means for imparting oscillating movement to the rock shafts 69 and 75 will be described later.

The front ends of the infeed tapes 20 and 21 are carried by the blade head 80 to which the shear blade 22 is secured, the details of the mounting means of which will be hereinafter described. The head 80 is a hollow member which is relatively massive and which is provided to impart dimensional stability to the shear blade 22. Both the head and the shear blade are disposed at a slight angle to the horizontal, as shown in Fig. 3, in order to provide the desired shearing angle which is common to shearing apparatus in general.

Slides 81 are secured to the ends of the head 80 for cooperation with ways 82 which are suitably secured to the side frames 30 and 31, as shown in Fig. 2. Thus, the head 80 is mounted for vertical sliding movement. The head is actuated by a suitable eccentric 84 and yoke 83, one at each side of the machine, the yokes being connected to the lower ends of the slides 81, as shown in Fig. 4. The eccentrics 84 are mounted on a common shaft 85, as shown in Fig. 3, and are driven by the motor 36 through a suitable clutch, not shown, which is located in the clutch housing 37. Secured to the head 80 are brackets 86 by means of which the mounting mechanism for the front ends of the infeed tapes may be attached to the head 80.

Secured to the brackets 86 are depending arms which cooperate with the brackets 86 and the head 80 to provide a frame 89 in which the rollers 41 and 44 are supported to provide both for the bite adjustment and for the pressure relief. The bite adjustment is applied to the upper roller 41, and the pressure relief to the lower.

The lower front roller 44 is mounted on a shaft 90 which is supported in arms 91, the arms being pivotally mounted in the frame 89, and the pivotal connection being indicated by the pivots 92.

The upper front roller 41 is mounted on a shaft 95 which is supported in arms 96. The arms 96 are adjustably secured to the frame 92 by means of screws 97 and 97a. Of these two screws, 97 can preferably serve as a pivot and 97a as a clamping screw. A set screw 98 provides means for regulating the angular disposition of the arms 96 with respect to the frame 92, thus providing a bite adjustment for the front rollers 41, 44 and the infeed tapes 20, 21. The slots 97b and 97c (Fig. 9) permit a coarser degree of regulation.

As shown in Fig. 1, the rollers 41 and 44 are provided with grooves 99 which receive the tapes 20 and 21, thus providing a continuous flush surface. The rollers 41 and 44 serve to squeeze the folded end of the signature, and hence the bite adjustment 98 is provided to regulate the squeeze action to a fine degree. According to the present invention there has been found that much greater accuracy in trimming is obtained if the signatures are subjected to an effective squeezing operation just prior to positioning and clamping.

The pressure relief is applied to the mounting for the lower shaft 90, as indicated by the pressure relief device 93 which includes a spring 94. This arrangement permits the shaft 90 and the front ends of arms 91 to swing downwardly. By locating the pivot 92 close to the shaft 90 the pressure exerted by the spring 94 is multiplied very substantially.

The drive means

In order to obtain proper synchronism with the stitcher mechanism, the tapes are driven from the drive shaft 100 of the stitcher mechanism, as shown in Fig. 4. The infeed tapes are driven at their rear end by means of suitable driving mechanism (not shown) interposed between the drive shaft 100 and a shaft 101 on which the pulleys 40 are mounted, and between the drive shaft 100 and a shaft 102 for the pick up drum 43. The spacing between the elements 40 and 43 is not critical at this point due to the shape of the tape path which is provided. In other words, there can be a half inch or even an inch clearance between the upper and lower tapes at the bite of the elements 40 and 43, but since the tapes are in contact with each other immediately above the bite, a signature of any thickness will be grasped by the tapes when the signature is lifted off of the stitcher rail by a suitable tucker blade 138.

The outfeed tapes 24, 25 and the various cam-actuated mechanisms to be later described are driven from a cam shaft 105 which is connected to the drive shaft 100 by means of suitable sprocket means 104, as shown in Fig. 4. The cam shaft 105 is suitably journalled in the side frame extension plates 34 and 35, and projects from either side thereof, as shown in Figs. 2 and 3. The right end of the cam shaft 105, as shown in those figures and in Fig. 12, is provided with a sprocket 106 which drives a tension idler 107 mounted on an arm 108 and urged downwardly by a suitable spring 109. The right ends of the shafts 53 and 60, which support the outfeed front pulleys 48, 51, terminate in sprockets 110 and 111, respectively, which are driven by a suitable sprocket chain 112, which meshes with the idler 107. In operation, the tension idler and its associated parts permit adjustment of the frame 55 to accommodate signatures of varying thicknesses, as above pointed out.

Also shown in Fig. 12, is a compensator cam 113 mounted on the cam shaft 105 and engaged by a truck 114 which reacts against a loading spring 115. Since it is intended that the trimmer device be driven, except for the shear blade, from the stitcher mechanism, the available power of which is somewhat limited, the compensator means 113, 114 and 115 permits smoother operation and provides a relatively constant load throughout all portions of the cycle thereby minimizing the power requirements of the trimmer device.

The rock shaft 69 which opens the upper outfeed tapes 24, is actuated by a cam 140 (Fig. 4) which is mounted on the cam shaft 105. The cam 140 engages a follower lever 141 which is connected by a link 142 to an arm 143 on the rock shaft 69.

Figure 11:
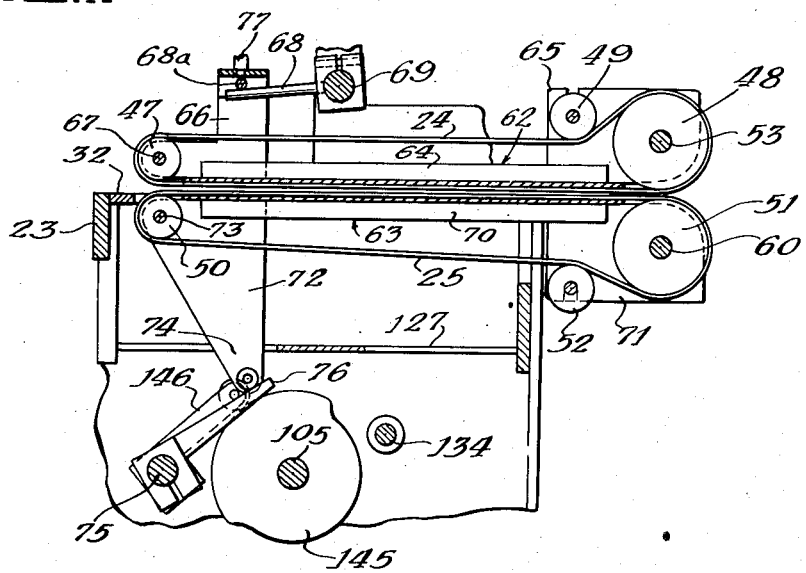
Fig. 11 is a longitudinal section taken along line 11—11 of Fig. 3, and showing the means for actuating the rock shaft for the lower outfeed tapes.

Similarly, a cam 145, shown in Fig. 11, engages a suitable follower arm 146 which is connected to the rock shaft 75, to open and close the lower outfeed tapes 25 in synchronism with the upper tapes 24. The rock shafts 69 and 75 are suitably journalled in extension plates 34, 35.

The positioning stops

Figure 13:
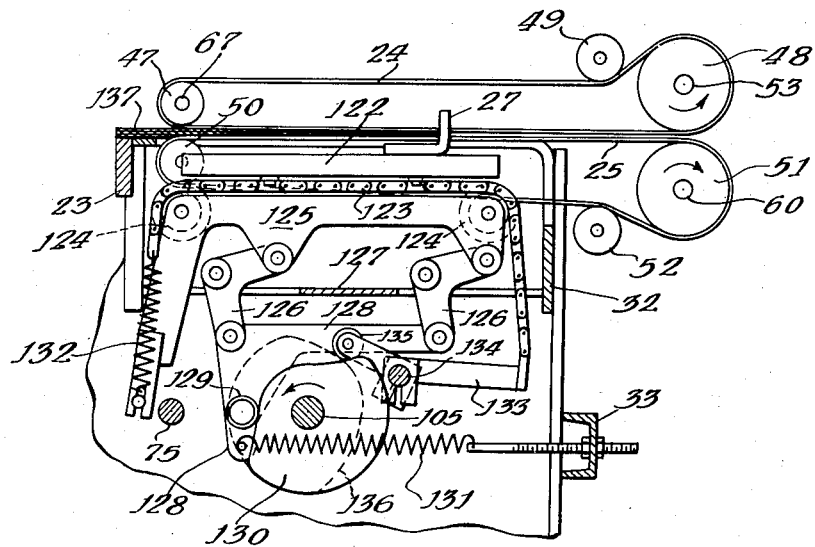
Figs. 13 and 14 are views similar to Fig. 1, but showing the stop means in changed positions.

As shown in Figs. 15 and 17 the horizontal portion of the bed plate 32 is provided with longitudinally extending slots 120 into which the frame members 70 and lower tapes 25 extend and through which the stop members 27 extend. The stop members 27 are adjustably and reversibly mounted on bars 122 which are secured to and supported by a chain 123, as shown in Figs. 1, 12 and 13. The chain is tensioned around sprockets 124 which are mounted on a movable frame 125.

Means are provided to impart vertical and horizontal movement to the stop members 27; the vertical movement serving to retract the same downwardly after the conclusion of the trimming operation, in order to permit forward movement of the signature after trimming and when the outfeed tapes have moved into closed position, and the horizontal movement being a rearward movement which serves to position accurately the signature just prior to the trimming operation.

Figure 14:
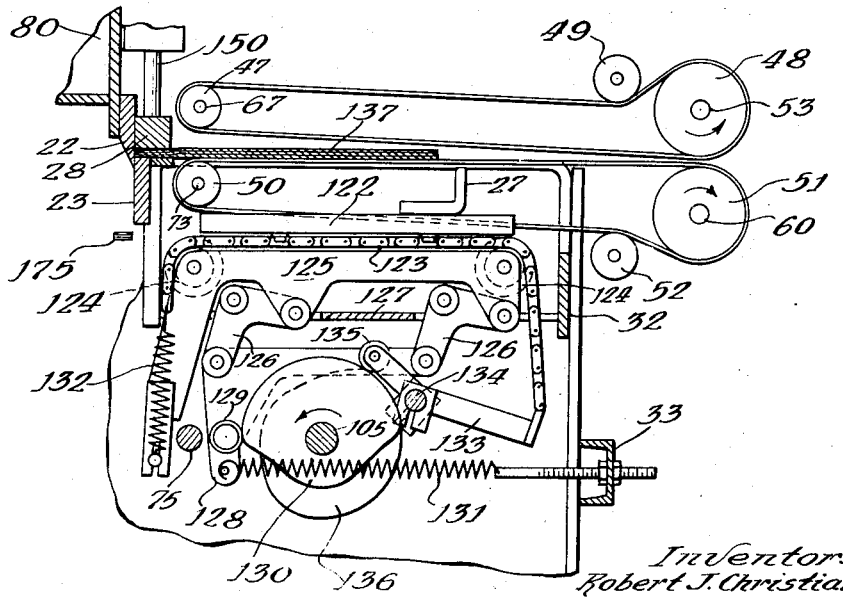

A separate frame and a separate chain are provided for each stop member, of which there may be five as shown in Figs. 2 and 3. The frame 125 is mounted on a pair of bell cranks 126, as shown in Figs. 1, 13 and 14. The bell cranks are pivotally mounted on a horizontal longitudinally extending member 127 secured to the downward extending flanges of the bed plate 32. The lower ends of the bell cranks are connected to an actuating member 128 which carries a follower 129 which is engaged by a cam 130 mounted on the cam shaft 105. A suitable spring 131 urges the follower 129 into engagement with the cam 130.

In operation it will be observed that a separate cam is provided for each frame 125, so that a substantially vertical movement is imparted to all of the frames simultaneously, thereby causing retraction or projection of the stop members.

The means for imparting horizontal movement to the stop members comprises a spring 132 connected to one end of the chain 123, and an arm 133, mounted on rock shaft 134, which is connected to the other end of chain 123. The rock shaft 134 is provided with a follower 135 located as shown in Figs. 3 and 13, and which engages a cam 136 mounted on the cam shaft 105. When the parts are in the Fig. 13 position, the spring 132 is extended and the stop member 27 is in its forward position. When the arm 133 moves upwardly into its Fig. 1 position, the stop member 27 will move rearwardly from the Fig. 13 position to the Fig. 1 position, thus positioning the signature. In moving from the Fig. 1 position to the Fig. 14 position in which the frame 125 is retracted, additional downward movement is imparted to the arm 133 to compensate for the retracted position of the frame.

The operation of the stop members 27 is illustrated in Fig. 15 in which a signature 137 is shown in two successive positions. In the first position it is resting on the infeed tapes 21 and misaligned with respect to the shear blade 22. This misalignment may be due to any one of various causes. As the signature 137 moves forwardly, its folded edge will engage only one of the stops 27. Assuming that there is no bounce and that the momentum of the signature is not sufficient to align the same, then the signature will come to rest in the misaligned position shown. The rearward movement of the stops 27 will straighten out the signature as shown by the broken line position of the signature. The rearward position of the stops 27 is shown in dotted lines. Thus, the trailing edge may be clamped when the signature has been finally positioned to the end that the signature is maintained in its proper position during the trimming operation.

Similarly, if bounce occurs, the rearward movement of the stops 27 takes up the bounce gap and insures accurate positioning.

The position of the L-shaped stop members 27 on the bars 122 can be reversed to bring the stops up to within 2½ inches of the shear blade 22, thus permitting the trimming of small pamphlets or signatures, without interfering with the motion of the shear blade 22 which is mounted on the front side of the blade head 80.

The presser foot and bridge

The free edges of the signature 137 are maintained in proper position during the actual shearing by the presser foot 28 which is resiliently mounted with respect to the shear blade 22. As shown in Figs. 3 and 18, the presser foot 28 is carried by three stems 150 each of which is slidably mounted in a lower bushing 151 which is, in turn, secured to the head 80 by a suitable support block 152. The upper end of the stem is slidably received in upper bushing 153 which is supported by a spring tube 154, also mounted in the support block 152. A flange 155 is provided on the stem 150, and a spring 156 is confined between the flange 155 and the upper bushing 153. Thus, relative upward movement of the stem and presser bar with respect to the head 80 is provided which permits the shear blade 22 to move downwardly beyond the limiting position of the presser foot 28 as determined by its engagement with the signature 137.

In order to prevent canting of the presser foot which would interfere with the clamping action, and which would also cause jamming or binding of the stems 150, equalizing means are provided. As shown in Figs. 1 and 18, the upper end of the stem terminates in a yoke held pin 157 which is engaged by a slotted arm 158 secured to a torque shaft 159. The torque shaft is suitably journalled in uprights 160 secured to the side frames 30 and 31 to permit rocking motion. Thus, both the absolute and the relative motion of any one of the three stems 150 is controlled by the movement of any other stem with the result that the presser foot 28 is always maintained in a horizontal position irrespective of whether the signature underlies only one end of the presser bar or whether it is centered.

Means are provided to bridge the gap between the infeed tapes 20, 21 and the bed plate 32, during the feeding operation, this means comprising a bridge member 165 shown in Figs. 1, 9 and 21, together with means to retract the same to permit the trimmings to drop through the gap during the shearing operation. According to this invention, the retracting means operate in such a manner that the movement of the bridge will not interfere with the downwardly falling movement of the trimmings. To this end, the bridge 165 is carried on the head 80 so that it moves up and down with the infeed tapes 20 and 21, but an additional rotational movement is imparted to the bridge to open up a gap through which the trimmings may drop.

As shown in Fig. 9, a short shaft 166 is journalled in the frame 92. A sprocket 168 is secured to the outer end of the shaft 166 and an arm 169 is secured to the inner end thereof. The forward end of the arm carries an inwardly projecting half-round 170 which engages the bridge 165. The bridge 165 is a hollow triangular sheet metal member supported at both ends by the arms and half-hounds 169 and 170, and it will be understood that the construction herein described is duplicated at the right side of the machine.

A stationary sprocket 171 is suitably secured to side member 30 as shown in Figs. 1 and 21. A length of chain 172, the free ends of which are connected by a coil spring 173, is disposed about the sprockets 168 and 171. Thus the loop, comprising the chain and spring, can be expanded and contracted to accommodate the up-and-down movement of the head 80 which carries the bridge 165.

In operation, it will be seen from a comparison of the positions shown in Figs. 21 and 22 that the upper end of the chain 172 moves with respect to the axis of the shaft 166, thereby causing rotation of the sprocket 168 in a counterclockwise direction when the head 80 moves downwardly. Thus, although the overall displacement of the bridge 165 is downwardly, the bridge itself is rotated and tilted upwardly to open up the gap which was formerly bridged by the bridge member. In other words, the rotation of the bridge is upwardly but this is accomplished in such a manner that the bridge will not catch any trimmings which drop downwardly through the gap. On the upward movement of the head, the bridge is rotating in the clockwise direction, thus avoiding the type of interference that would occur if the bridge were mounted on a stationary axis and opened downwardly which would result in an upwardly snapping movement at the conclusion of the trimming operation.

A set screw 174 permits adjustment of the stationary sprocket 171 on its mounting so as to regulate the angular position and rotation of the bridge 165.

Operation

To summarize the operation which has been heretofore described in detail in connection with the description of the various parts and sub-assemblies, the signature 137, is picked up from the stitcher rail 26 and fed by the infeed tapes 20, 21, across the bridge 165, under the shear blade 22, onto the bed plate 32, and into engagement with the stops 27. At this time, the stops are extended upwardly through the bed plate, and therefore stop the forward motion of the signature 137. The outfeed tapes 24 and 25 are open at this time so that there will be no smudging due to contact between the printed material and the tapes.

Then the stops 27 move rearwardly to position the signature to correct for misalignment and bounce. At the conclusion of the positioning, the trailing edge of the signature overhangs the stationary blade 23, as shown in Fig. 1.

Then the head 80 descends, causing the presser foot 28 to engage the signature 137 just before the cooperation of blades 22 and 23 severs the trailing edge to provide the trimming 175 shown in Fig. 14. At this time, the stops are retracted below the bed plate 22.

As the head 80 descends, the bridge 165 also drops below the level of the bed plate 32 and the upward rotation thereof, caused by the chain and sprocket mechanism 168, 171, 172, will open up a gap for the trimming 175.

After the shearing operation, as the head 80 rises, the bridge rotates downwardly so as not to interfere with the falling motion of the trimming 175.

As the shear blade 22 is thus retracted, the outfeed tapes 24 and 25 close substantially simultaneously with the release by the presser foot 28 of the signature 137, thus engaging the same and removing it to make way for another signature. The backing provided by the webs of channel members 64 and 70 for the outfeed tapes 24 and 25 respectively, provide an abrupt and positive engagement of the signature by the tapes with the result that any tendency for smudging at this time is minimized.

The stops 27 are then projected into the forward stop position and the outfeed tapes 24, 25 opened. At this time the head 80 is in its elevated position so that the bridge 165 and the infeed tapes 20, 21 are properly aligned with the bed plate 32, and ready for a subsequent infeeding operation.

The trimmer device is driven from the stitcher mechanism except for the shear blade 22, and the head 80 and its associated parts. These latter are driven by the motor 36 through a suitable clutch located in clutch housing 37. The clutch is preferably a magnetic clutch and brake device which, upon suitable actuation, rotates through a single cycle and then automatically comes to a stop. This cycle is initiated automatically by means of a micro-switch 176 which, as shown in Fig. 4, may be mounted for actuation by one of the cams on the cam shaft 105, such as the cam 140. The cycle of the shear blade may preferably occupy 180° of the cycle of operation of the trimmer device.

The remainder of the trimmer device is powered from the stitcher mechanism, and to this end the compensator cam 113 is provided in order to equalize the load.

As previously indicated, just before positioning and clamping, the rollers 41 and 44 squeeze the folded end of the signature so that the several pages thereof lie flat, thus providing a square trimmed edge.

The infeed and outfeed tapes and their respective supporting elements are so mounted that the bite can be regulated; thus the machine may be set up for trimming signature of varying thickness. Furthermore, as previously indicated, pressure relief means is provided to avoid jamming of the machine.

By virtue of the equalizing means provided by the presser foot, it is possible to provide a machine of considerable width so that triple or quadruple length signatures can be operated upon when the occasion demands, but which, at the same time, is capable of operating upon single length signatures without the necessity of centering the signatures so as to avoid canting of the presser foot 28.

Although only a preferred embodiment of this invention has been shown and described herein, it will be understood that various modifications and changes may be made in the construction shown without departing from the spirit of the invention as pointed out by the appended claims.

We claim:

1. A trimmer for book signatures comprising a machine frame, a shear blade mounted in said frame for reciprocating vertical movement, a pair of infeed tapes disposed rearwardly of said shear blade, a pair of outfeed tapes disposed forwardly thereof, retractable stop means disposed adjacent to the lower of said outfeed tapes and adapted to be engaged by a signature fed beneath said shear blade to interrupt the forward movement of the same, means for moving said stop means rearwardly to align and position the signature with respect to said shear blade, means for separating said outfeed tapes while said signature is being positioned, and a presser foot for engaging said signature adjacent to its trailing edge for maintaining the same in aligned position after positioning and during trimming.

2. A trimmer as claimed in claim 1 in which said infeed tapes are carried by said shear blade.

3. A trimmer as claimed in claim 1 including means for holding said presser foot against canting.

4. A trimmer for book signatures comprising a machine frame, a shear blade mounted in said frame for reciprocating vertical movement, a pair of infeed tapes disposed rearwardly of said shear blade, a pair of outfeed tapes disposed forwardly thereof, retractable stop means disposed adjacent to the lower of said outfeed tapes and adapted to be engaged by a signature fed beneath said shear blade to interrupt the forward movement of the same, means for moving said stop means rearwardly to align and position the signature with respect to said shear blade, a presser foot for engaging said signature adjacent to its trailing edge for maintaining the same in aligned position after positioning, said presser foot being yieldingly mounted on said blade for reciprocating movement therewith, bridge means carried by said shear blade for bridging the gap between said infeed tapes and said shear blade, and means to open said bridge means downwardly and with an upward rotation so as to avoid interference with the trimmings.

5. An automatic stitcher trimmer comprising in combination a reciprocating shear blade for performing a trimming operation, a slotted bed plate disposed forwardly thereof to support a signature during said trimming operation, a vertically moveable frame disposed beneath said slotted bed plate, a chain slidably mounted on said frame, a spring connecting one end of said chain to said frame, a rock shaft, an arm on said rock shaft, the other end of said chain being connected to said arm whereby oscillating motion of said rock shaft causes extension of said spring and consequent forward and back motion of said chain, stop means carried by said chain and moveable therewith, and means for raising and lowering said frame to cause said stop means to be projected above and to be retracted below the upper surface of said bed plate in timed relationship to the oscillation of said rock shaft to impart both horizontal and vertical movement to said stop means.

6. An automatic stitcher trimmer comprising a reciprocating shear blade for performing a trimming operation, a slotted bed plate disposed forwardly thereof to support a signature during said trimming operation, a moveable frame placed beneath said slotted bed plate, a chain slidably mounted on said frame, an anchor, a spring connecting one end of said chain to said anchor to permit relative movement of said chain and frame, actuating means connected to the other end of said chain whereby reciprocating motion of said actuating means causes extension of said spring and consequent forward and back motion of said chain, stop means carried by said chain, supporting means disposed beneath said frame, a pair of bell cranks mounted on said supporting means, an actuating member connected to said bell cranks and provided with a cam follower, said frame being mounted on said bell cranks, and a cam engaging said follower for rotating said bell cranks to raise and lower said frame and said stop means.

7. In a trimmer device, means for imparting both horizontal and vertical movement to a stop member comprising a frame, a stop supporting member shiftably disposed on the upper surface of said frame, said stop member being secured to said stop supporting member, a spring connected to one end of said stop supporting member, actuating means connected to the other end of said stop supporting member whereby reciprocating movement of said actuating means causes horizontal movement of said stop supporting member, and means for raising and lowering said frame to cause vertical movement of said stop supporting member.

8. In a trimmer device including a shear blade, means for adjustably mounting a horizontally and vertically moveable stop member comprising a frame, means for raising and lowering said frame, a flexible tension member disposed on the upper surface of said frame, a spring connected to one end of said flexible tension member, actuating means connected to the other end of said flexible tension member whereby reciprocating movement of said actuating means causes horizontal movement of said flexible tension member, a horizontal bar carried by said tension member above the upper surface of said frame, and a stop member adjustably mounted on said bar whereby the position of said stop member may be adjusted with respect to said shear blade without requiring corresponding adjustment to the position of said frame.

9. In a trimmer device as claimed in claim 8 in which a bar is provided with a longitudinally extending slot and in which said stop member is an L-shaped member having a horizontal portion overlying said slot, the combination of clamping means passing through said horizontal portion and with said slot for adjustably mounting said stop member on said bar and for permitting reversal of said stop member with respect to said bar.

10. In a trimmer device as claimed in claim 8 in which said stop member is an L-shaped member having a horizontal portion overlying said bar, and a vertical stop portion, the combination of means removably securing said horizontal portion to said bar so that the position of said L-shaped member may be reversed in order to adjust the position of said vertical stop portion.

11. An automatic stitcher trimmer for operation in conjunction with stitcher mechanism which includes a drive shaft comprising a bed plate, shearing means for trimming a signature disposed on said bed plate, power means for operating said shearing means, retractable stop means for positioning said signature prior to the trimming of same, outfeed tape means for removing a signature from said bed plate after the trimming of same, mounting means for said tape means for moving same between open and closed position, cam means for actuating said tape mounting means and said stop means in timed relationship to each other, means for driving said cam means from said drive shaft, means actuated by the rotation of said drive shaft for controlling the operation of said power means so that said shearing means will be operated in timed relationship to said cam means, and compensator means to equalize the power requirements of said cam means throughout its cycle of operation.

12. An automatic stitcher trimmer for operation in conjunction with stitcher mechanism which includes a drive shaft comprising a bed plate, shearing means for trimming a signature disposed on said bed plate, outfeed tape means for removing a signature from said bed plate after the trimming of same, mounting means for said tape means for moving same between open and closed position, cam means for actuating said tape mounting means, means for driving said cam means from said drive shaft, and compensator means to equalize the power requirements of said cam means throughout its cycle of operation.

13. An automatic stitcher trimmer for operation in conjunction with stitcher mechanism which includes a drive shaft comprising a bed plate, shearing means for trimming a signature disposed on said bed plate, retractable stop means for positioning said signature prior to the trimming of same, infeed tape means for advancing a signature to be trimmed on to said bed plate, outfeed tape means for removing a signature from said bed plate after the trimming of same, mounting means for said outfeed tape means for moving same between open and closed position, cam means for actuating said tape mounting means and said stop means in timed relationship to each other, and means for driving both of said tape means and said cam means from said drive shaft.

14. In a trimmer device which includes a reciprocating shear blade for performing a trimming operation and a slotted bed plate disposed forwardly thereof to support a signature during said trimming operation, the combination of means for positioning and maintaining a signature in aligned position during said trimming operation comprising a retractable stop disposed beneath said slotted bed plate and adapted to be projected through the same to interrupt the forward motion of a signature delivered thereto, means for moving said stop rearwardly when in projected position to align the signature with respect to said shear blade, a presser foot yieldably mounted on said shear blade for engaging said signature after the same has been aligned and just prior to the trimming operation, means to retract said stop after said signature has been engaged by said presser foot, and means to prevent the canting of said presser foot which includes a plurality of stems slidably supported with respect to said shear blade, said presser foot being mounted on said stems, a shaft supported with respect to said bed plate for rocking motion, and a plurality of arms non-rotatably secured to said shaft at one end and engaging said stem at the other end.

15. In a trimmer device which includes a reciprocating shear blade for performing a trimming operation and a slotted bed plate disposed forwardly thereof to support a signature during said trimming operation, the combination of means for positioning and maintainng a signature in aligned position during said trimming operation comprising a retractable stop disposed beneath said slotted bed plate and adapted to be projected through the same to interrupt the forward motion of a signature delivered thereto, means for moving said stop rearwardly when in projected position to align the signature with respect to said shear blade, a presser foot yieldably mounted on said shear blade for engaging said signature after the same has been aligned and just prior to the trimming operation, means to retract said stop after said signature has been engaged by said presser foot, and means to prevent the canting of said presser foot, said last named means including a plurality of stems slidably supported with respect to said shear blade, said presser foot being mounted on said stems, springs urging said stems downwardly, means for limiting the downward position of said stems with respect to said shear blade but permitting relative upward displacement of said stems with respect to said shear blade, and means for limiting the displacement of all stems to an equal extent.

16. In a trimmer, the combination of a vertically reciprocating shear blade, a bed plate disposed forwardly thereof, a frame mounted on said shear blade, a pair of rollers carried by said frame and movable therewith, two tape supporting means disposed rearwardly of said rollers, and a pair of infeed tapes, each being supported at its rear end by one of said tape supporting means and at its front end by one of said rollers, the bite of said rollers being disposed, when said shear blade is in elevated position, in alignment with said bed plate so that a signature engaged by said infeed tapes when said shear blade is in elevated position will be fed underneath said shear blade and onto said bed plate.

17. The combination as claimed in claim 16 including means for mounting said rollers so that the bite thereof is adjustable.

18. The combination as claimed in claim 16 including means for yieldingly mounting one of said rollers.

19. In a trimmer, the combination of a vertically reciprocating shear blade, a frame mounted on said shear blade, a pair of rollers carried by said frame and movable therewith, a plurality of grooves in each roller for receiving an upper and a lower series of cooperating infeed tapes, a pair of arms mounted on said frame, one of said rollers being journalled in said arms, a second pair of arms pivotally mounted on said frame, the other one of said rollers being journalled in said second pair of arms, means for limiting the pivotal movement of said second pair of arms so as to maintain a minimum spacing between said rollers, pressure relief means disposed between said second pair of arms and said frame to permit movement of said second roller away from said first roller to prevent jamming, and means for adjusting the position of said first pair of arms with respect to said frame so that the minimum spacing between said rollers can be adjusted to provide a squeezing action on the fold of a signature fed between said rollers by said infeed tapes.

20. A trimmer comprising the combination of a vertical reciprocating shear blade for performing a trimming operation, a bed plate disposed forwardly thereof for supporting a signature during said trimming operation, a pulley mounted at the front end of said bed plate, a front frame pivotally mounted with respect to said bed plate, a second pulley carried by said front frame and disposed above said first pulley, means for adjusting the elevation of said front frame with respect to said bed plate to regulate the bite between said pulleys, a swinging frame pivotally mounted at its front end with respect to said bed plate for movement between a closed position and an open position in which it is downwardly displaced, a second swinging frame pivotally mounted at its front end on said front frame for movement between a closed position and an open position in which it is upwardly displaced, tape supporting means carried by each of said swinging frames at the rear ends thereof, a lower outfeed tape disposed about said first pulley and one of said tape supporting means, an upper outfeed tape disposed about said second pulley and the other one of said tape supporting means, and means for actuating said swinging frames in timed relation to the operation of said shear blade to remove a signature from said bed plate after said trimming operation.

21. A trimmer comprising a combination of a vertical reciprocating shear blade for performing a trimming operation, a slotted bed plate disposed forwardly thereof for supporting a signature during said trimming operation, lower and upper pulleys mounted at the front end of said bed plate, swinging frame means pivotally mounted at its front end with respect to said lower pulley for movement between a closed position and an open position in which it is downwardly displaced, second swinging frame means pivotally mounted at its front end with respect to said upper pulley for movement between a closed position and an open position in which it is upwardly displaced, tape supporting means carried by each of said swinging frame means at the rear ends thereof, lower tape means disposed about said lower pulley and one of said tape supporting means, upper tape means disposed about said upper pulley and the other one of said tape supporting means, and means for actuating said swinging frame means in timed relation to the operation of said shear blade to remove a signature from said bed plate after trimming operation.

22. A trimmer as claimed in claim 21 in which said lower and upper tape means each comprise a plurality of laterally spaced tapes, and in which said first and second swinging frame means each comprise a plurality of laterally spaced frames, one for each tape, and which includes two separate rock shafts mounted with respect to said bed plate, one being disposed adjacent to said upper swinging frame means, and the other being disposed adjacent to said lower swinging frame means, a set of fingers carried by each rock shaft, one for each swinging frame, each of said fingers engaging a portion of a swinging frame, a cam shaft rotatably mounted with respect to said bed plate, cam means carried thereby, and follower means engaged by said cam means for causing oscillation of both of said rock shafts to move said tapes between open and closed positions.

23. In a trimmer which includes a series of lower retractable outfeed tapes and a plurality of retractable stop members disposed in alternating relationship, the combination of a separate longitudinally disposed frame for supporting each tape and a separate longitudinally disposed frame for supporting each stop member whereby separate motions may be imparted to said tapes and said stop members without interference, and means for imparting separate motions to said tape frames and to said stop member frames including a single transversely disposed cam shaft having a separate cam for each of said stop member frames, and a single transversely disposed rock shaft disposed parallel to said cam shaft and driven thereby, and having a separate arm for engaging each of said tape frames.

24. A trimmer comprising a machine frame, a blade head slidably mounted in said machine frame, a shear blade secured to said blade head, a bed plate disposed forwardly of said shear blade, infeed means disposed rearwardly of said shear blade, a bridge disposed in the gap between the front end of said infeed means and the rear edge of said bed plate, said shear blade cooperating with said rear edge to provide a trimming operation on the trailing edge of a signature disposed on said bed plate, a pair of arms rotatably carried by said blade head, said bridge being mounted at either end on said arms whereby the up and down movement of said blade head causes said bridge to move between an elevated position in which it is aligned with said infeed means and said bed plate and a depressed position in which it is downwardly displaced, and means for causing rotation of said bridge as it moves between said elevated and depressed position, said means comprising a sprocket secured to one of said arms, a length of chain meshing with said sprocket, a spring, said length of chain being connected at one end to said spring, and means for anchoring the other end of said length of said chain and the other end of said spring to said machine frame, whereby up and down movement of said blade head will cause rotative oscillation of said sprocket and said bridge and whereby a compound motion is imparted to said bridge which avoids interference with the falling movement of said trailing edge after it has been trimmed by said shear blade.

25. A trimmer comprising a machine frame, a blade head slidably mounted in said machine frame, a shear blade secured to said blade head for performing a trimming operation, a bed plate disposed forwardly of said shear blade, a bridge rotatably mounted on said head and disposed adjacent the rear edge of said bed plate whereby the up and down movement of said blade head causes said bridge to move between an elevated position in which it is aligned with said bed plate and a depressed position in which it is downwardly displaced, and means for causing rotation of said bridge as it moves between elevated and depressed positions, said means comprising a rotatably mounted sprocket associated with said bridge for rotating same, a stationary sprocket secured to said machine frame, a loop means comprising a length of chain having its ends connected to the ends of a coil spring and disposed around both of said sprockets so that the chain portion of said loop means will mesh with both of said sprockets, whereby up and down movement of said blade head will cause oscillation of said rotatably mounted sprocket and said bridge.

References Cited in the file of this patent

UNITED STATES PATENTS 1,892,327    Buccicone    Dec. 27, 1932